Oct. 7, 1952 — R. DEIBEL — 2,612,874
FLUID MOTOR
Filed July 23, 1949
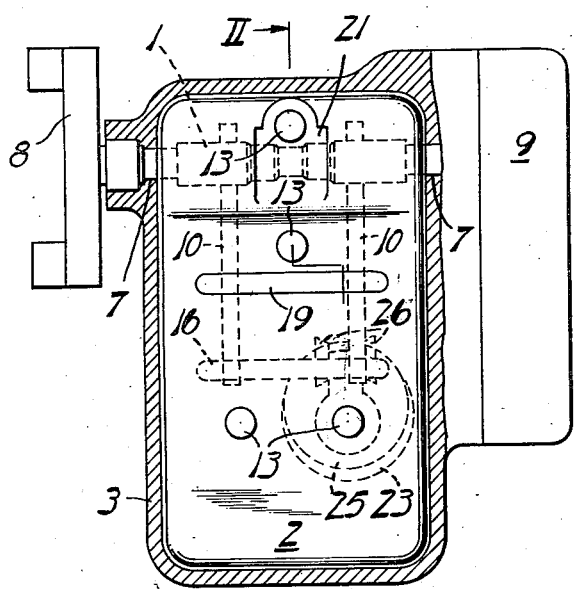
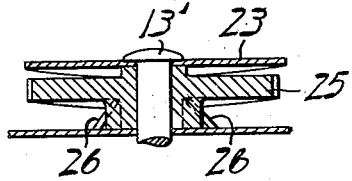
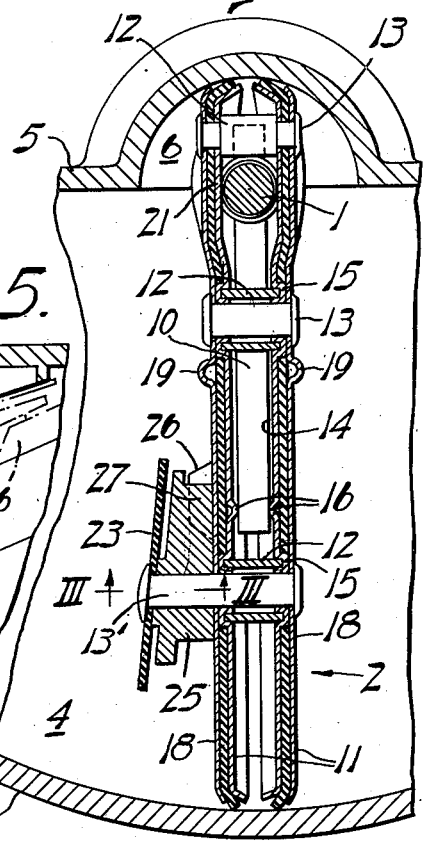
INVENTOR
Raymond Deibel
BY Bean, Brooks, Buckley & Bean
ATTORNEYS Patented Oct. 7, 1952

2,612,874

UNITED STATES PATENT OFFICE 2,612,874

FLUID MOTOR

Raymond Deibel, East Aurora, N. Y., assignor to Trico Products Corporation, Buffalo, N. Y.

Application July 23, 1949, Serial No. 106,356

6 Claims. (Cl. 121—97)

This invention relates to a fluid actuated motor especially designed for automotive use and primarily for windshield cleaning, the same being an improvement on that constituting the subject matter of copending application, Serial No. 83,486.

Windshield cleaners are largely suction actuated from the intake manifold, the pressure influence of which is fluctuating in character and at times quite inadequate. The wiper motor most frequently embodies a paddle or vane-like piston fixed on a shaft to swing in an arcuate chamber under the reverse applications of an actuating pressure differential. If the shaft is slightly misplaced, a binding of parts occurs and a resultant drag or load is imposed upon the light motor with its fluctuating power supply.

The primary object of this invention is to simplify the motor construction in a manner that will facilitate the production of the motor.

Again, the invention resides in a fluid motor wherein the piston-forming paddle will float with respect to its driven shaft and readily adjust itself to the walls of the motor chamber.

The foregoing and other objects will manifest themselves as the following description progresses, reference being had therein to the accompanying drawing, wherein Fig. 1 is a substantially radial section through a motor constructed in accordance with the present invention;

Fig. 2 is a cross-sectional view about on line 2—2 of Fig. 1;

Fig. 3 is a fragmentary view about on line 3—3 of Fig. 2;

Fig. 4 is a view of the shaft unit, partly in section; and

Fig. 5 is a fragmentary sectional view of the motor.

Referring more particularly to the drawing, the numeral 1 designates the motor shaft, 2 the vane-like piston or paddle operatively connected to the shaft for oscillating the same, and 3 the motor casing having an arcuate chamber 4 therein. The chamber is closed by a removable section or cover 5 and is likewise formed with an arcuate chamber 6 of smaller radius for receiving the upper portion of the piston where it extends beyond the shaft. At opposite sides of the chamber 4 the shaft is journaled in bearings in the casing and its cover, as indicated at 7. One end of the shaft carries a coupling part 8 to which an accessory is connectible, such as a windshield wiper, by suitable means, not shown. The opposite end of the shaft extends within the valve chamber 9 which contains automatic snap action valve mechanism for operatively reversing the pressure differential applications on the opposite sides of the paddle, or piston, all as is well known in the automotive industry.

In accordance with the present invention the piston has a certain relative play or freedom of movement with respect to its shaft. Therefore, should there be any misalignment or discrepancy in the relation between the shaft bearing and the walls of the motor chamber 4, 6, the piston will freely follow the walls of the chamber and automatically adjust itself on the oscillating motor shaft. To this end the motor shaft is provided with a laterally extending crank part, in the form of one or more pins or rods 10, loosely fitting between the two opposed sections 11 of the piston. In order to maintain a limited freedom of movement between the crank part and the piston, the sections of the latter are spaced apart by interposed tubular sustaining spacers 12 and the rivets 13, or other suitable fasteners.

The inner plates 14 of the piston sections may have annular grooves 15 about the rivets to receive the tubular spacers. These plates also have wear pads in the form of transverse ribs 16 upon which the outer end portions of the crank pins ride. Each crank pin may be readily connected to the shaft by driving the bur enlargement 17 thereon into a diametrical hole through the shaft, leaving its opposite ends protruding. This affords a practical mode of connecting the parts. The outer plates 18 may also have pressed ribs 19 for reinforcement.

The freedom of axial movement of the piston sections 11 on the shaft is confined by spaced shoulders 20 between which a cooperating flat shoulder 21, shaped from the inner plate 14, plays. The shoulders may be formed by reducing the diameter of the central part of the shaft. A further reduction at 22, between the shoulders, affords ample clearance for the uppermost spacer 12 to accommodate the floating motion of the vane-like piston. This will also permit of slight angular displacement of the piston should the crank pins be inaccurately placed on the shaft. Should the pins be sprung out of alignment they may possess inherent resiliency to facilitate the self-adjustment of the piston thereon.

The piston is free to float and follow the contour of the path delineated by the chamber walls free from any binding action of the piston upon such walls or of the shaft in its bearings. Therefore, the piston will respond to a smaller pressure differential head, relative to the former fixedly related parts, and thereby continue a satisfactory performance over a wider range of pressures. Maximum efficiency is therefore insured throughout longer time intervals with the result that any sluggish or retarded operation due to insufficient suction will be of brief duration and in those installations where supplemental sources of air pressure are provided, the demands made upon such supplemental sources will obviously be at less frequent intervals and for shorter time periods.

The usual parking valve 23 engages its seat 24 for being suction held thereon in securing the piston arrested. A practical manner of mounting this valve is to support it on a separate boss 25 and then to anchor the latter upon the proper outer plate 18 by one of the rivets 13'. Guiding lugs 26, struck up from the plate, receive a radial extension 27 from the boss 25 to facilitate the proper placement of the latter.

The motor operates with an easy and free action devoid of any binding which would otherwise require a labored movement, and while the foregoing description has been given in detail, it is without thought of limitation since the inventive principles involved are capable of assuming other physical embodiments without departing from the spirit of the invention and the scope of the appended claims.

What is claimed is:

1. A fluid motor comprising an arcuate chamber, an oscillatory shaft journaled therein and formed with a radial recess, a piston movable back and forth in the chamber in fluid sealed contact with the chamber wall, said piston being in the form of a vane extending radially from the shaft and lying substantially in the plane of the axis of oscillation, and a radial crank pin secured in the recess of the shaft and having a play connection with the piston for limited radial movement in such plane.

2. A fluid motor comprising an arcuate chamber, an oscillatory shaft journaled therein and carrying radial pins spaced along the shaft within the chamber, and a piston movable back and forth in the chamber in fluid sealed contact with the chamber wall and having an inner chamber receiving the shaft and its pins for limited relative movement, whereby the shaft and the piston may move independently of each other to accommodate any misalignment between the shaft bearing and the walls of the chamber.

3. A fluid motor comprising a chamber having a parking valve seat, an oscillatory shaft journaled in the chamber, a piston movable back and forth in the chamber and operatively connected to the shaft for driving the same, said piston having spaced guiding lugs, a boss seating on the piston and having a radial positioning part slidably fitting between the lugs, and a parking valve carried by the boss for engaging with the seat.

4. A fluid motor comprising an arcuate chamber, an oscillatory shaft journaled therein and having a diametral hole therethrough, a piston movable back and forth in the chamber in fluid sealed contact with the chamber wall, and a pin having a driven fit in the shaft hole and extending radially therefrom in opposite directions, said piston comprising spaced sections arranged on opposite sides of the pin, and fastening means uniting the piston sections together in a manner to enable relative movement between the piston and the pin.

5. A fluid motor comprising an arcuate chamber, an oscillatory shaft journaled concentrically therein, a piston movable back and forth in the chamber in fluid sealed contact with the chamber wall, the piston comprising opposed sections arranged on opposite sides of the shaft and movably connected thereto, each piston section comprising inner and outer plates clampingly embracing an interposed packing member, said chamber having a parking valve seat, a parking valve, and a fastener for securing the piston sections together and serving also to anchoring the parking valve on the piston, the outer plate having a guide pressed therefrom to receive a positioning part on the parking valve.

6. A fluid motor comprising an arcuate chamber, an oscillatory shaft journaled therein, a piston movable back and forth in the chamber in fluid sealed contact with the chamber wall, said piston comprising spaced sections arranged on opposite sides of the shaft, with each section comprising inner and outer body plates with an interposed packing member therebetween, the inner body plates having opposed wear pads pressed therefrom, and a drive pin fixed on the shaft and riding between and upon the wear pads while permitting the piston to float radially of and upon the shaft.

RAYMOND DEIBEL.

REFERENCES CITED

The following references are of record in the file of this patent:

UNITED STATES PATENTS

| Number | Name | Date |
|---|---|---|
| 2,285,621 | Sibley | June 9, 1942 |